Figure 1:
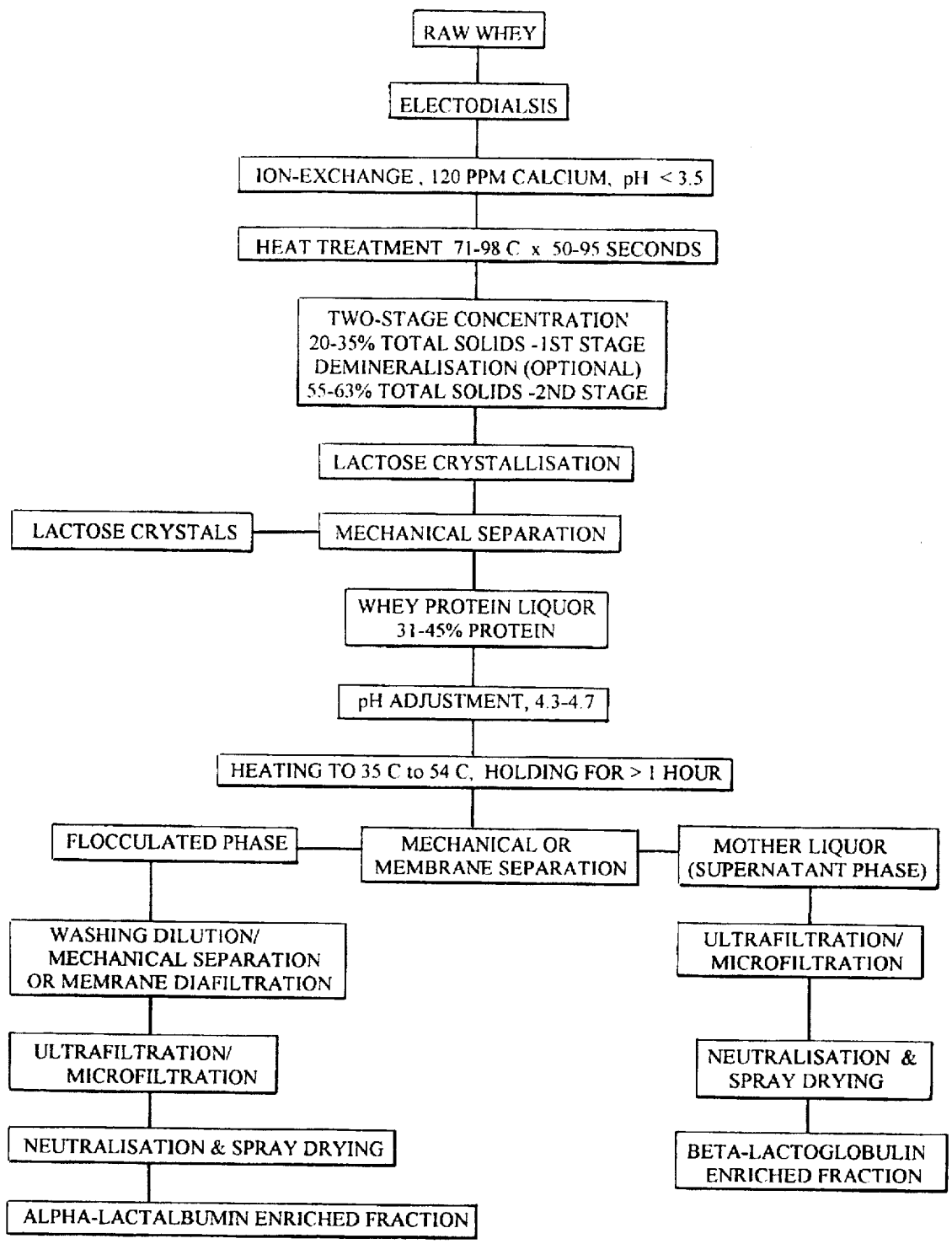

United States Patent [19]

Stack et al.

[11] Patent Number: 5,747,647
[45] Date of Patent: May 5, 1998

[54] PROCESS FOR THE FRACTIONATION OF WHEY CONSTITUENTS

[75] Inventors: Francis Martin Stack, Mitchelstown; Mark Hennessy, Fermoy; Daniel Mulvihill, Ballincollig; Brendan Thomas O'Kennedy, Dungarvan, all of Ireland

[73] Assignee: Dairygold Technologies Limited, Cork, Ireland

[21] Appl. No.: 750,675

[22] PCT Filed: Jun. 13, 1995

[86] PCT No.: PCT/IE95/00033

§ 371 Date: Mar. 14, 1997

§ 102(e) Date: Mar. 14, 1997

[87] PCT Pub. No.: WO95/34216

PCT Pub. Date: Dec. 21, 1995

[30] Foreign Application Priority Data

Jun. 15, 1994 [IE] Ireland .................................. S940489

[51] Int. Cl.⁶ .............................. C07K 1/14; C07K 16/04

[52] U.S. Cl. .................. 530/365; 530/366; 530/412; 530/418

[58] Field of Search .................................. 530/365, 366, 530/412, 418

[56] References Cited

U.S. PATENT DOCUMENTS 3,637,653 1/1972 Wingerd et al. .................. 260/122
4,711,953 12/1987 Roger et al. ....................... 530/366

*Primary Examiner*—Cecilia J. Tsang
*Assistant Examiner*—Anish Gupta
*Attorney, Agent, or Firm*—Kennedy & Kennedy

[57] ABSTRACT

A process for fractionation of dairy whey is described which enables various whey constituents, in particular, alpha-lactalbumin and beta-lactoglobulin, to be recovered in substantially pure form. Lactose may also be recovered. The mineral content of raw whey is reduced so that the calcium content is less than 120 parts per million. Thereafter, the whey is treated to allow the lactose to crystallize out for removal and selectively to flocculate the alpha-lactalbumin, leaving a liquor containing substantially pure beta-lactoglobulin.

9 Claims, 2 Drawing Sheets

1

PROCESS FOR THE FRACTIONATION OF WHEY CONSTITUENTS

This invention relates to the recovery of protein and other products from whey and in particular to the fractionation of alpha-lactalbumin and beta-lactoglobulin from whey.

Whey is an aqueous run-off product in the manufacture of certain dairy products, such as cheese and caseins. In addition to a portion of dairy fat, the whey contains proteins, lactose and minerals. The predominant proteins in the whey are alpha-lactalbumin and beta-lactoglobulin. These components are economically valuable in their own right and in particular when recovered in partially or substantially purified form.

One process known for the treatment of whey is that described in EP 0 368 864 B1. In this process (hereinafter referred to as "the Pearce process"), the raw whey is treated to reduce its specific gravity and ionic strength to a level of not less than 25% of the original values. Either before or after the treatment, the pH is adjusted to between 3.8 and 5.5 by the addition of acid. Next, the whey is heated to between 55° C. and 70° C. for at least 30 seconds to permit selective aggregation of the alpha-lactalbumin fraction. Thereafter, the whey is cooled to below 55° C. for a time sufficient to permit flocculation of the aggregated protein and the flocculated alpha-lactalbumin is harvested. The beta-lactoglobulin remains soluble under the conditions used, along with other whey constituents such as lactose and can be recovered from the mother liquor if required.

Another process for recovering purified protein fractions from whey has been described by Amundson, C. H. et al, Journal of Food Processing and Preservation 6, 55–71, 1982. The Amundson process varies significantly from the Pearce process in that it is the beta-lactoglobulin which is selectively precipitated, with the alpha-lactalbumin remaining in solution in the mother liquor. According to the Amundson process, raw whey is treated to concentrate the protein while removing low molecular weight fractions such as water, minerals and lactose. The pH of the concentrate is adjusted to 4.65, followed by a demineralisation step to remove low molecular weight ions, including calcium ions. The pH is then readjusted to 4.65. Under the conditions of pH and low ionic strength used, the beta-lactoglobulin aggregates and can be separated as a precipitate, leaving the alpha-lactalbumin in solution.

The present invention seeks to provide an efficient, integrated process for treating whey for the recovery of its constituents, particularly a substantially pure beta-lactoglobulin fraction, an enriched alpha-lactalbumin fraction and lactose.

Accordingly, the present invention provides a process for the recovery of whey constituents, comprising the steps of:

(a) reducing the mineral content of raw whey and in particular reducing the calcium content to below 120 parts per million (p.p.m.) on a dry matter basis;

(b) reducing the pH of the whey to between 1.8 and 3.4;

(c) heating the whey to between 71° C. and 98° C. for between 50 seconds and 95 seconds, followed by rapid cooling to about 10° C.;

(d) concentrating the whey to between 55% and 63% total solids at a temperature not exceeding 69° C.;

(e) cooling the whey for a period of time and at a temperature sufficient to permit crystallisation of lactose from the whey;

(f) separating the resulting lactose crystals from the remaining whey protein liquor;

(g) adjusting the pH of the whey protein liquor to a pH of between 4.3 and 4.7 at a temperature of less than 10° C. and then heating to a temperature of between 35° C. and 54° C. for between 1 and 3 hours;

(h) separating the resultant flocculant comprising enriched alpha-lactalbumin from the whey protein liquor comprising substantially pure beta-lactoglobulin; and (i) purifying the alpha-lactalbumin enriched flocculant by washing with a solution isoionic with the whey protein liquor, adjusting to a pH of between 4.3 and 4.7 and refractionating the alpha-lactalbumin by centrifugation or filtration.

The beta-lactoglobulin fraction can be further concentrated by ultrafiltration, giving a beta-lactoglobulin retentate and a permeate.

In a preferred process, the steps (a) and (b) are carried out using a combination of electrodialysis and cation exchange. This allows the pH to be reduced to the required value with or without the direct addition of acid and the cation concentration to be reduced to the required level. Preferably, the pH is adjusted to between 1.8 and 2.2. Steps (a) and (b) may be carried out simultaneously.

The concentration of the whey may be carried out in a two stage process, the first stage being a concentration at less than 70° C. to between 20% and 35% total solids content and the second stage being effected at 64° C. or less to achieve a total solids content of between 55% and 63%, the first stage concentration being achieved by evaporation or by use of membranes and evaporation, the second stage being effected by evaporation.

Optionally, a further demineralisation step or steps may be undertaken after the first concentration stage and before the second concentration stage to reduce further the amount of phosphate present.

After the heat conditioning step (c), the proteins in the whey remain in a soluble state and accordingly, in step (f) the lactose can be removed by crystallisation and mechanical separation without taking with it these proteins. After removal of the lactose crystals, the remaining whey protein liquor typically contains between 31% and 45% protein on a dry matter basis. The preferred temperature range for flocculating the alpha-lactalbumin component of this whey liquor at step (g) is between 35° C. and 54° C. Most preferably, step (g) is conducted at temperature of 52°+/−2° C.

After fractionation of the alpha-lactalbumin from the beta-lactoglobulin, both products may be subjected to further downstream processes, including defatting, neutralisation, concentration and/or spray drying.

In the process of the invention, raw whey is treated partially to demineralise it and the pH is adjusted to 3.4 or less. While the pH adjustment may be at least partially achieved by the addition of acid, in a preferred process the pH reduction is brought about by cation exchange without the addition of acid. The whey may be cheese whey, acid or rennet casein whey. Next, the whey undergoes a high temperature treatment, at between 71° C. and 98° C. At this temperature and under the prevalent ionic conditions, the beta-lactoglobulin remains in solution, while the alpha-lactalbumin undergoes a change which nevertheless results in no flocculation of the alpha-lactalbumin protein molecules. Next the whey is cooled and concentrated, after which lactose crystals are permitted to grow at the lower temperatures. The crystals are collected, and the whey protein liquor, containing the alpha-lactalbumin and beta-lactoglobulin both in a soluble state, is retained. In the next step, the whey protein liquor is adjusted to between pH 4.3 and 4.7 and heated to between 35° C. and 54° C., under which conditions the alpha-lactalbumin flocculates. This flocculation allows alpha-lactalbumin to be separated from soluble beta-lactoglobulin by mechanical separation which results in an enriched alpha-lactalbumin stream and a substantially pure beta-lactoglobulin stream.

The process will now be described in more detail with reference to the accompanying drawings in which:

FIG. 1 shows a flow sheet representing an exemplary process according to the invention; and FIG. 2 is a chromatogram showing recovery of beta-lactoglobulin.

Referring to FIG. 1, raw whey is treated to reduce its mineral content, specifically, the calcium ions are reduced to less than 120 p.p.m. on a dry matter basis. The demineralisation is preferably achieved by electrodialysis and ion exchange, which has the advantage that at the same time as removing the ions, the pH can be reduced to below 3.5 and preferably to the desired point within the range of between 1.8 and 2.2. Using standard electrodialysis, up to 70% of the required demineralisation can be achieved. Then, a cation exchanger is used to remove sodium, potassium, magnesium and particularly calcium.

Next, the whey is subjected to a heat treatment at a temperature of between 71° C. and 98° C. for between 50 seconds and 95 seconds. Due to the low pH, the beta-lactoglobulin remains substantially soluble during the high temperature step. The very low calcium ion concentration combined with the heat treatment has the effect of inducing change in the alpha-lactalbumin fraction without promoting the aggregation of protein. Thus, after the heat treatment step, the whey proteins exist as substantially soluble protein.

In the next step, the temperature is reduced rapidly to below 10° C., after which the whey is concentrated to between 55% and 63% total solids. Conveniently, the concentration is achieved in two stages. In the first stage, the temperature is raised to not greater than 70° C. and the solids content of the whey is increased to between 20% and 35%. Then, in the second stage, at a temperature of not more than 64° C., the total solids content is further increased to between 55% and 63%. The concentration may be achieved by any standard means used in the art, for example by evaporation.

After the first stage of the concentration, additional electrodialysis and/or other demineralisation steps may be optionally conducted to remove other components such as phosphates.

Following concentration, the temperature of the whey is reduced from 64° C. to about 10° C. and the growth of lactose crystals is promoted. Once the crystallisation is complete, the lactose crystals are separated from the whey by mechanical separation, leaving the whey proteins in the whey protein liquor. The lactose prepared by this process is typically high quality lactose. For example, the quality obtained is usually sufficiently high for the lactose to be saleable as "refined edible" grade lactose.

At this stage, the whey protein liquor contains between 31% and 45% protein on a dry matter basis.

Finally, the alpha-lactalbumin and beta-lactoglobulin fractions are separated from one another. This is achieved by adjusting the pH of the whey protein liquor to between 4.3 and 4.7 at less than 10° C., then heating the whey protein liquor to between 35° C. and 54° C., preferably about 52°+/-2° C. and holding at that pH and temperature for a period of at least one hour. The flocculant is separated mechanically or by membrane separation from the remaining mother liquor to give an enriched alpha-lactalbumin fraction. The mother liquor contains soluble beta-lactoglobulin in a substantially pure form. In down-stream processing steps, the alpha-lactalbumin fraction may be washed by mechanical means and/or by membrane diafiltration systems, and both alpha-lactalbumin and beta-lactoglobulin fractions may be concentrated by ultrafiltration. The fat content of each product can be reduced by mechanical separation and/or microfiltration. Finally, the products are neutralised by the addition of base and spray dried.

The following non-limiting examples are given by way of illustration of processes within the scope of the invention.

EXAMPLE 1

4000 litres of clarified acid casein whey was demineralised using commerically available electrodialysis and ion-exchange equipment. The combined demineralisation resulted in a product depleted in calcium, to less than 120 p.p.m. on a dry matter basis. In this demineralisation system the pH was reduced to 2.0. The product was then heat treated at a temperature of 94°+/-1° C. for a period of 60 seconds followed by rapid cooling to 10° C. prior to concentration in two stages, firstly to 22% total solids at a maximum temperature of 69° C. and finally to 62% total solids at a maximum temperature of 63° C. Lactose crystallisation was achieved by means of controlled cooling. Lactose crystals were removed by mechanical separation leaving a concentrated whey protein liquor containing 37% protein on a dry matter basis.

Figure 2A:
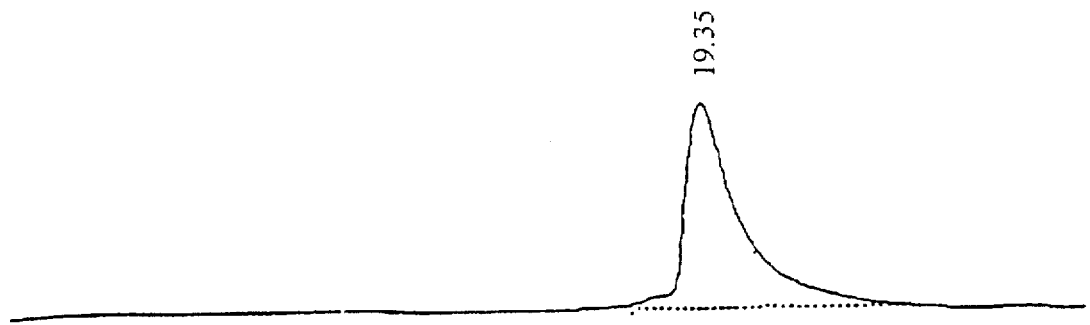
Figure 2B:
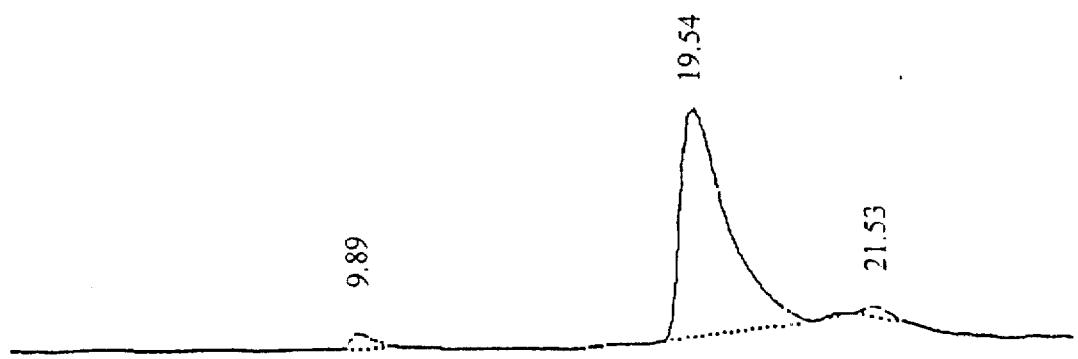

The concentrated whey protein solution was adjusted to a pH of 4.45 at 8° C., then heated to 53°+/-1° C. and held in a conditioning vessel at that temperature for a minimum of 1 hour. All the concentrated whey protein had been removed from the conditioning vessel after the elapse of 3 hours. Holding under these conditions promoted selective flocculation of alpha-lactalbumin. The whey protein liquor was separated using a centrifugal separation which resulted in two streams, a heavy phase containing an enriched flocculation of alpha-lactalbumin and a light phase comprising a highly pure beta-lactoglobulin solution with no other major whey protein fractions present. FIG. 2a shows a chromatogram of a beta-lactoglobulin sample standard (SIGMA CHEMICAL COMPANY), while FIG. 2b is a chromatogram of the beta-lactoglobulin fraction obtained from this Example, and Table 1 details the peaks obtained from this fraction.

TABLE 1

MAJOR HPLC FEATURES

| Peak Retention Time (min) | Peak Identification | Proportion of Total, % |
|---|---|---|
| 9–10, 23–25 | Casein derived peptides | 5.4 |
| 19–20 | beta-lactoglobulin | 94.6 |

The alpha-lactalbumin enriched fraction was further purified by a series of washings using a solution isoionic with the whey protein liquor, pH adjustment to pH 4.45 and refractionation by centrifugal separation giving a final alpha-lactalbumin enriched fraction.

The two protein streams were further concentrated using ultrafiltration.

Fat concentrations were reduced using mechanical separation and microfiltration.

The final beta-lactoglobulin product was neutralised with a combination of KOH, NaOH, Mg(OH)$_2$ and Ca(OH)$_2$, concentrated to 20% total solids and spray dried.

The final alpha-lactalbumin product was neutralised with a combination of KOH, NaOH, Mg(OH)$_2$ and Ca(OH)$_2$, concentrated to 20% total solids and spray dried.

EXAMPLE 2

4000 litres of cheddar cheese whey was clarified and used as the raw material. The process was then as in Example 1.

EXAMPLE 3

4000 litres of clarified rennet casein whey was used as the raw material. The process was then as in Example 1.

EXAMPLE 4

In this example, the process was undertaken as in Examples 1, 2 and 3 but included an additional demineralisation step when the product was at 22% total solids. This demineralisation step was included to reduce further the phosphate levels. The product was then concentrated to 62% total solids at 63°+/-1° C. and the process proceeded as in Examples 1, 2 and 3.

EXAMPLE 5

In this example, the process was undertaken as in Examples 1, 2 and 3. However, the beta-lactoglobulin fraction was diafiltrated to 75% protein on a dry matter basis, concentrated to 20% total solids, neutralised with a combination of KOH, NaOH, Mg(OH)$_2$ and Ca(OH)$_2$ and dried.

EXAMPLE 6

In this example the process was undertaken as in Examples 1, 2 and 3. However, the alpha-lactalbumin fraction was enriched by a combination of washing and ultrafiltration to 65% protein on a dry matter basis, concentrated to 22% total solids, neutralised with a combination of KOH, NaOH, Mg(OH)$_2$ and Ca(OH)$_2$.

It will of course be understood that the invention is not limited to the specific details described herein, which are given by way of example only, and that various modifications and alterations are possible within the scope of the invention as defined in the appended claims.

We claim:

1. A process for the recovery of whey constituents, comprising the steps of
   (a) reducing the calcium content to below 120 parts per million (p.p.m.) on a dry matter basis;
   (b) reducing the pH of the whey to between 1.8 and 3.4;
   (c) heating the whey to between 71° C. and 98° C. for between 50 seconds and 95 seconds, followed by rapid cooling to about 10° C.;
   (d) concentrating the whey to between 55% and 63% total solids at a temperature not exceeding 69° C.;
   (e) cooling the whey for a period of time and at a temperature sufficient to permit crystallisation of lactose from the whey;
   (f) separating the resulting lactose crystals from the remaining whey protein liquor;
   (g) adjusting the pH of the whey protein liquor to a pH of between 4.3 and 4.7 at a temperature of less than 10° C. and then heating to a temperature of between 35° C. and 54° C. for between 1 and 3 hours;
   (h) separating the resultant flocculant comprising enriched alpha-lactalbumin from the whey protein liquor comprising substantially pure beta-lactoglobulin; and
   (i) purifying the alpha-lactalbumin enriched flocculant by washing with a solution isoionic with the whey protein liquor, adjusting to a pH of between 4.3 and 4.7 and refractionating the alpha-lactalbumin by centrifugation or filtration.

2. A process according to claim 1, in which the pH is reduced in step (b) to between 1.8 and 2.2.

3. A process according to claim 1, in which steps (a) and (b) are carried out simultaneously by a combination of electrodialysis and cation exchange.

4. A process according to claim 1, in which the concentration step (d) is carried out in two stages, the first stage comprising concentrating the whey to between 20% and 35% total solids content at a temperature less than 70° C. and the second stage comprising concentrating to a total solids content of between 55% and 63% at a temperature no greater than 64° C.

5. A process according to claim 4, in which the first concentration stage is effected by evaporation or by the combined use of membranes and evaporation and the second concentration stage is effected by evaporation.

6. A process according to claim 4, in which an additional electrodialysis and/or demineralisation step is carried out between the two concentration stages.

7. A process according to claim 1, in which step (g) is carried out at 52° C.±2° C.

8. A process according to claim 1, in which the lactose crystals are separated from the whey protein liquor by mechanical separation.

9. A process according to claim 1, in which the resultant alpha-lactalbumin or beta-lactoglobulin product is subjected to any of defatting, neutralisation, concentration and/or spray drying.

* * * * *